US009948914B1

(12) United States Patent
Pinkus et al.

(10) Patent No.: US 9,948,914 B1
(45) Date of Patent: Apr. 17, 2018

(54) ORTHOSCOPIC FUSION PLATFORM

(71) Applicant: The United States of America, as represented by the Secretary of the Air Force, Washington, DC (US)

(72) Inventors: Alan R Pinkus, Bellbrook, OH (US); David W Dommett, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 151 days.

(21) Appl. No.: 15/143,670

(22) Filed: May 2, 2016

Related U.S. Application Data

(60) Provisional application No. 62/157,580, filed on May 6, 2015.

(51) Int. Cl.
*H04N 13/00* (2018.01)
*H04N 13/02* (2006.01)
(Continued)

(52) U.S. Cl.
CPC ......... *H04N 13/004* (2013.01); *G06T 7/0026* (2013.01); *G06T 7/0097* (2013.01);
(Continued)

(58) Field of Classification Search
CPC .................................................. H04N 13/004
(Continued)

(56) References Cited

U.S. PATENT DOCUMENTS 4,695,130 A * 9/1987 Medina .............. G02B 27/2207
359/464
5,001,558 A   5/1991 Burley et al.
(Continued)

FOREIGN PATENT DOCUMENTS

EP        2284509 A1    2/2011

OTHER PUBLICATIONS

Bahadori et al., "A Stereo Vision System for 3D Reconstruction and Semi-Automatic Surveillance of Museum Areas," (2003), available at http://citeseerx.ist.psu.edu/viewdoc/versions?doi=10.1.1.59.8237.

(Continued)

*Primary Examiner* — Tracy Y Li
(74) *Attorney, Agent, or Firm* — AFMCLO/JAZ; Charles Figer, Jr.

(57) ABSTRACT

A mobile three-dimensional sensor configuration is provided with a first sensor of a second type mounted proximate to the first sensor of a first type. A second sensor of the second type is mounted proximate to a second sensor of the first type. The first and second sensors are coupled to a first platform operable to vary the azimuth and elevation of the first and second sensors of the first and second types. The first and second platforms are mounted on a translational drive configured to independently translate the first and second platforms with respect to one another. A controller is configured to receive images sensors of and further configured to create a pair fused images of the first sensors of the first and second type and the second sensors of the first and second type. The controller is still further configured to display the pair of fused images.

11 Claims, 24 Drawing Sheets
(2 of 24 Drawing Sheet(s) Filed in Color)

(51) Int. Cl.
*G06T 17/10* (2006.01)
*G06T 7/00* (2017.01)
(52) U.S. Cl.
CPC ............ *G06T 17/10* (2013.01); *H04N 13/025* (2013.01); *H04N 13/0296* (2013.01); *G06T 2207/20164* (2013.01); *H04N 2013/0092* (2013.01)
(58) Field of Classification Search
IPC .......................................................... H04N 9/47
See application file for complete search history.

(56) References Cited

U.S. PATENT DOCUMENTS

| | | | | |
|---|---|---|---|---|
| 5,367,333 | A * | 11/1994 | Harriman | G01S 11/12 340/971 |
| 5,555,324 | A | 9/1996 | Waxman et al. | |
| 5,748,301 | A * | 5/1998 | Muller | G01B 11/2755 33/286 |
| 6,535,242 | B1 * | 3/2003 | Strumolo | B60R 11/04 348/148 |
| 6,606,406 | B1 | 8/2003 | Zhang et al. | |
| 6,646,799 | B1 | 11/2003 | Komiski et al. | |
| 6,665,003 | B1 * | 12/2003 | Peleg | G06T 3/4038 348/36 |
| 7,176,790 | B2 * | 2/2007 | Yamazaki | B60Q 9/008 257/60 |
| 7,345,277 | B2 | 3/2008 | Zhang | |
| 7,806,604 | B2 * | 10/2010 | Bazakos | G06K 9/00255 348/153 |
| 7,809,258 | B2 | 10/2010 | Strandemar et al. | |
| 8,331,654 | B2 | 12/2012 | Abraham et al. | |
| 8,531,562 | B2 | 9/2013 | Schmidt et al. | |
| 2002/0190162 | A1 * | 12/2002 | McDonnell | B64D 3/02 244/170 |
| 2005/0100207 | A1 | 5/2005 | Konolige | |
| 2007/0247517 | A1 * | 10/2007 | Zhang | G06K 9/2018 348/30 |
| 2007/0279514 | A1 | 12/2007 | Mitsumine et al. | |
| 2010/0013927 | A1 * | 1/2010 | Nixon | G01C 11/06 348/144 |
| 2010/0182396 | A1 * | 7/2010 | Kroepfl | G01S 19/14 348/36 |
| 2010/0182406 | A1 | 7/2010 | Benitez | |
| 2010/0208032 | A1 * | 8/2010 | Kweon | G03B 37/00 348/36 |
| 2010/0231716 | A1 * | 9/2010 | Klaerner | B60R 1/00 348/148 |
| 2010/0289885 | A1 | 11/2010 | Lu et al. | |
| 2010/0295945 | A1 * | 11/2010 | Plemons | B60R 1/00 348/148 |
| 2010/0303340 | A1 | 12/2010 | Abraham et al. | |
| 2010/0309315 | A1 * | 12/2010 | Hogasten | H04N 5/33 348/164 |
| 2011/0080466 | A1 | 4/2011 | Kask et al. | |
| 2012/0120069 | A1 * | 5/2012 | Kodaira | G06F 17/30271 345/419 |
| 2012/0194650 | A1 * | 8/2012 | Izadi | H04N 13/0271 348/47 |
| 2012/0210853 | A1 * | 8/2012 | Abershitz | B64F 1/04 89/1.11 |
| 2013/0108109 | A1 * | 5/2013 | Leuck | G06T 7/254 382/103 |
| 2013/0250123 | A1 | 9/2013 | Zhang et al. | |
| 2013/0300740 | A1 * | 11/2013 | Snyder | G06F 3/016 345/420 |
| 2015/0062292 | A1 * | 3/2015 | Kweon | H04N 5/23238 348/37 |
| 2015/0178936 | A1 * | 6/2015 | Boisson | H04N 13/0271 382/154 |
| 2015/0288948 | A1 * | 10/2015 | Schamp | H04N 13/025 348/47 |
| 2015/0341617 | A1 * | 11/2015 | Cole | G03B 17/561 348/36 |
| 2016/0086379 | A1 * | 3/2016 | Sadi | G06T 19/006 345/633 |
| 2016/0212409 | A1 * | 7/2016 | Cole | H04N 13/0022 |
| 2016/0214534 | A1 * | 7/2016 | Richards | H04N 5/332 |
| 2016/0266256 | A1 * | 9/2016 | Allen | G01S 17/89 |
| 2016/0353089 | A1 * | 12/2016 | Gallup | H04N 13/044 |
| 2016/0353090 | A1 * | 12/2016 | Esteban | H04N 13/044 |
| 2016/0363543 | A1 * | 12/2016 | Georgeson | G01N 22/02 |
| 2017/0018085 | A1 * | 1/2017 | Liepelt | G06T 3/4038 |
| 2017/0230585 | A1 * | 8/2017 | Nash | H04N 5/23296 |
| 2017/0234976 | A1 * | 8/2017 | Grauer | G01S 7/4868 356/5.04 |
| 2017/0305360 | A1 * | 10/2017 | Zajac | B60R 11/04 |

OTHER PUBLICATIONS

Toutin et al., "DEM Generation with ASTER Stereo Data," (2001), available at http://open.canada.ca/data/en/dataset/5107ed26-235f-53fe-bfb7-f22223492427.

Fricker et al., "Airborne Digital Sensors—A New Approach," (1999), available at https://www.ipi.uni-hannover.de/fileadmin/institut/pdf/fricker.pdf.

Kise et al., "Creating a panoramic field image using multi-spectral stereovision system," Computers and Electronics in Agriculture, vol. 60, Issue 1, Jan. 2008, pp. 67-75.

Shrestha et al., "Multispectral imaging using a stereo camera: concept, design and assessment," EURASIP Journal on Advances in Signal Processing, 2011, 2011:57, DOI: 10.1186/1687-6180-2011-57.

Harwin et al., "Assessing , the Accuracy of Georeferenced Point Clouds Produced via Multi-View Stereopsis from Unmanned Aerial Vehicle (UAV) Imagery," Remote Sensing (Impact Factor: 3.18), Dec. 2012, 4(6):1573-1599, DOI: 10.3390/rs4061573.

* cited by examiner

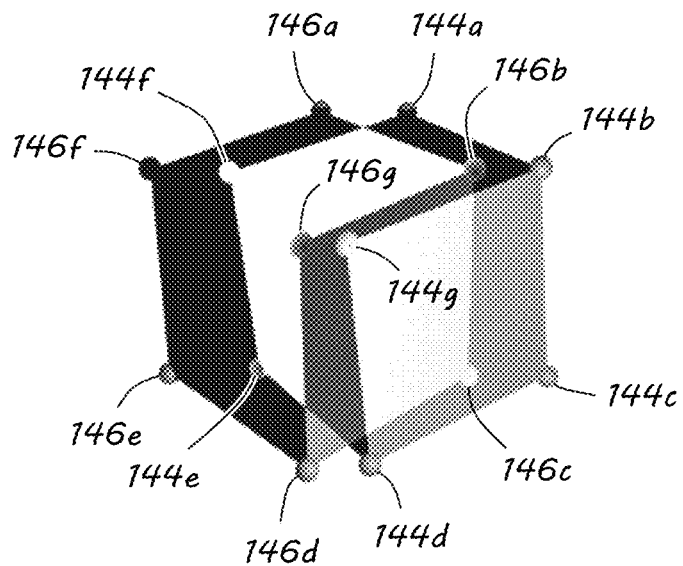
FIG. 27
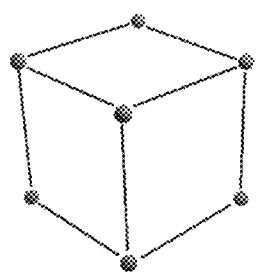 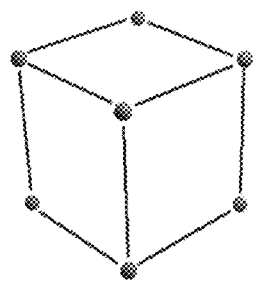
FIG. 28  FIG. 29

ORTHOSCOPIC FUSION PLATFORM

CROSS-REFERENCE TO RELATED APPLICATIONS

This application claims the benefit of and priority to U.S. Provisional Application Ser. No. 62/157,580, entitled "Orthoscopic Fusion Platform," filed on May 6, 2015, the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention generally relates to three-dimensional imaging and, more particularly, to fused three-dimensional multispectral imaging.

Description of the Related Art

While three-dimensional (3D) displays are rapidly becoming a popular entertainment medium, their use in tactical settings are not so well defined. An advantage of using a 3D display with remotely directed vehicles is to allow operators of those vehicles to move those vehicles through and aggressively maneuver in a 3D environment. This may also be beneficial in directly operated vehicles, providing those operators with additional visual information related to the environment through which the operator and vehicle are traversing. Stereoscopic cameras that could capture images for display on a 3D display are well known; however, these cameras alone do not provide any additional information that would not have already been available to the operator.

Light from the surrounding environment is sensed in color within the human eye. The human eye perceives colors using three types of cone cells sensitive to different part of the light spectrum, namely cone cells that are sensitive to red, green, and blue (RGB) wavelength light. Conventional cameras may receive or record RGB data that adequately replicate colors for human viewing. However, the spectrum of visible light reflecting off of an object being captured may contain a profusion of details that are lost to the coarse three-channel sensing of RGB data. These lost spectral details may otherwise reveal a multitude of additional information about objects that are recorded in images, as well as the lighting conditions under which the objects are recorded.

Accordingly, there is a need in the art for a mobile stereoscopic camera system that can take advantage of the additional spectral data to display in three dimensions to a local or remote vehicle operator to assist in maneuvering through an environment.

SUMMARY OF THE INVENTION

Embodiments of the invention describe a device and procedure for creating three-dimensional (3D) multi-spectral image using multiple pairs of different sensor types (e.g., color visible and thermal) that have a variable inter-sensing spacing mechanism. Software algorithmically combines or fuses (e.g., averaging, LaPlacian, Discrete Wavelet Transforms, Principal Component Analysis, morphological) the information from the difference sensor types to create a composite image that contains more information than the individual sensor channels (e.g., colorization of a thermal scene). There are many different sensor wavelength ranges to choose from: visible (VIS; 0.4-0.7 μm), near infrared (NIR; 0.7-1 μm), short-wave infrared (SWIR; 1-1.1 μm), medium-wave infrared (MWIR; 2-4 μm), and long-wave infrared (LWIR) or thermal (8-12 μm). Number and type of sensor selection is a function of the imaging goals (e.g., surveillance, target detection, weapons aiming, aerial reconnaissance, 3D mapping, navigation, underwater observation, space object analysis).

The continuously variable inter-sensor spacing enables imaging that embodies ortho-stereopsis, hyper-stereopsis, and micro-stereopsis. Ortho-stereopsis sensor spacing corresponds generally to the average inter-pupillary distance of human eyes (66 mm) to mimic and afford normal stereoscopic vision. Hyper-stereopsis is equivalent to setting an observer's eyes further apart (>70 mm) to provide enhanced stereo depth cues for very distant objects. Micro-stereopsis is equivalent to setting an observer's eyes closer together (<60 mm) to provide enhanced stereoscopic stereoscopic depth cues for very close viewing distances of small objects. Since the images are formed using stereo pairs of sensors (as compared to a single sensor moving along a path taking spatio-temporally separated frames) the system will function properly in real-time scenes that contain moving objects. The mechanized sensor suite could be placed on most any mobile (or fixed) platform (unoccupied aerial vehicle, truck, robotic platform, building, tower). The output of such an imaging system would be converted (if necessary) and displayed on most any of the multitudes of available 3D display technologies (anaglyphic, lenticular, holographic, swept volume, shuttered/polarized).

In particular, embodiments of the invention provide a mobile three-dimensional sensor configuration able to be implemented a number of movable platforms. The mobile three-dimensional sensor configuration includes a first sensor of a first type and a first sensor of a second type mounted proximate to the first sensor of the first type. A second sensor of the first type and a second sensor of the second type mounted proximate to the second sensor of the first type are spaced from the first and second sensors. The first sensors of the first and second types may be coupled to a first platform operable to vary the azimuth and elevation of the first sensors of the first and second types. The second sensors of the first and second types may also be coupled to a second platform operable to vary the azimuth and elevation of the second sensors of the first and second types. The first and second platforms may then be mounted on a translational drive, where the translational drive is configured to independently translate the first and second platforms with respect to one another. The mobile three-dimensional sensor configuration may also include a controller configured to receive images from the first and second sensor of the first type and the first and second sensor of the second type. The controller may be further configured to create a pair fused images of the first sensors of the first and second type and the second sensors of the first and second type. Finally, the controller may still be further configured to display the pair of fused images to an operator or other user.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 27 illustrates mapping of the salient points between the two images in FIGS. 25 and 26;

FIG. 28 is a 3D model of the visible imagery built from the salient points in FIGS. 20A and 20B;

FIG. 29 is a 3D model of the thermal imagery built from the salient points in FIGS. 21A and 21B;

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
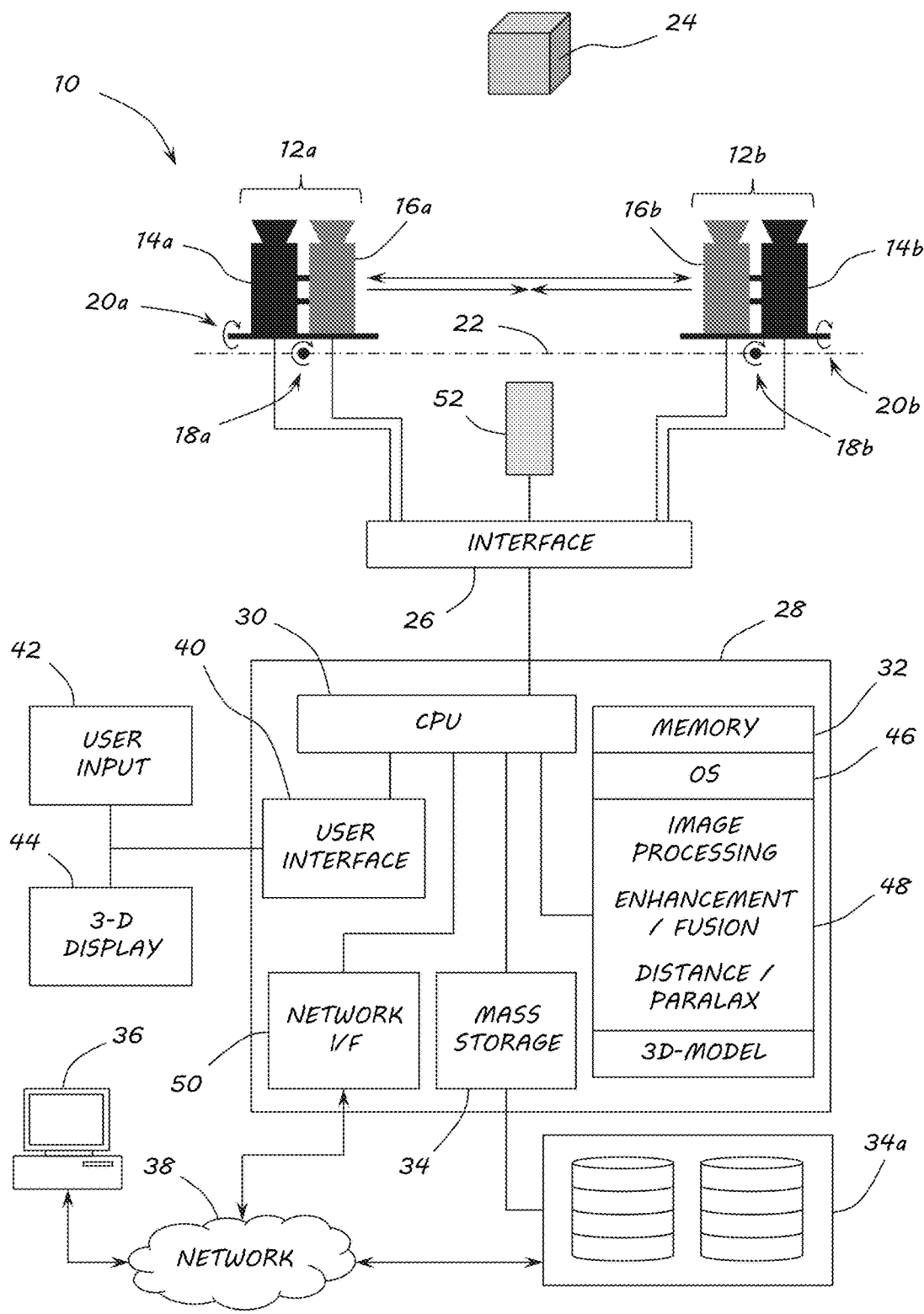
FIG. 1 is a schematic diagram of a system for providing multispectral stereoscopic images consistent with embodiments of the invention.

Embodiments of the invention provide a system for providing multispectral stereoscopic images that may be employed on a moving platform. Using a bio-inspired approach based on human visual perception scientific research, information from color low-light-level (LLL), short-wave infrared (SWIR), and long-wave infrared (LWIR, thermal), among others, solid-solid state sensors/cameras may be algorithmically combined or fused to yield high-information three-dimensional (3D) video images that function in real time. FIG. 1 schematically illustrates an exemplary configuration 10 of an embodiment of the invention that could be implemented on a moving vehicle. The exemplary embodiment includes left and right pairs of cameras 12a, 12b, with each pair of cameras including one of a video, LLL, SWIR, LWIR, thermal, etc. camera 14a, 14b, and the other including another of the video, LLL, SWIR, LWIR, thermal, etc. camera 16a, 16b. In other embodiments, more than two types of cameras could be used for the right and left cameras or different types may be used between the left and right.

Using sensors that differ in their spectral sensitivities allows the display of scene information that is not normally seen by the unaided human eye. A visible (VIS) spectrum, low-light-level (LLL) TV camera can sense colors under very low ambient lighting conditions. Near infrared (NIR) can render night-time scenes that are illuminated only by starlight. Chlorophyll has a high IR reflectivity. At night, short-wave infrared (SWIR) utilizes energy that is given off by the Sun's solar wind hitting the Earth's ionosphere. It is available over the entire surface of the globe. SWIR can penetrate atmospheric haze and can work with eye-safe laser pointers. Medium-wave infrared (MWIR) and long-wave infrared (LWIR; thermal) are sensitive to temperature differentials (ΔT) and readily show hot objects such as humans, fired weapons, and vehicles. NIR, SWIR, MWIR, and LWIR can be used to break camouflage.

Using different wavelength bands to sense scenes provides a large tactical advantage. These advantages may be amplified by algorithmically fusing multiple image types together and displaying them on 3D displays.

The camera pairs 12a, 12b may be mounted such that the pairs 12a, 12b can pivot toward or away from one another on pivot points 18a, 18b allowing for, in some embodiments, near 360° rotation of the camera pairs 12a, 12b. The camera pairs 12a, 12b are also mounted such that they can pivot about an axis 20a, 20b to change the elevational view of the cameral pairs 12a, 12b. Camera pairs 12a, 12b may also move translationally toward or away from one another along path 22 to assist in fixing the camera pairs 12a, 12b on an object 24 or area of interest. Actively varying the camera pairs 12a, 12b spatial separations to match an observer's individual eye separation provides comfort to the observer, while increasing or decreasing the separation may afford superior visual performance in specific tasks. Additionally, as the camera pairs 12a, 12b are moved throughout the separation range, they may also be toed-in or toed-out to aid in parallax compensation and range finding calculations.

Camera pairs 12a, 12b and any associated drive mechanisms, such as, for example, stepper motors or screw drives, that provide the pivoting and translation of the camera pairs may connect directly or through an interface 26 to a controller 28, which may be used to manipulate the orientations and positions of the cameras as well as process any images from the cameras. In other embodiments, controller 28 may be used to only process images from the cameras with another controller being used to manipulate the orientations and positions.

Controller 28 typically includes at least one processor 30 coupled to a memory 32. Processor 30 may represent one or more processors (e.g. microprocessors), and memory 32 may represent the random access memory (RAM) devices comprising the main storage of controller 28, as well as any supplemental levels of memory, e.g., cache memories, non-volatile or backup memories (e.g. programmable or flash memories), read-only memories, etc. In addition, memory 32 may be considered to include memory storage physically located elsewhere in controller 28, e.g., any cache memory in a processor 30, as well as any storage capacity used as a virtual memory, e.g., as stored on a mass storage device 34 or another computer coupled to computer 36 via a network 38. The mass storage device 16 may contain disk drives and arrays, RAM drives, solid-state drives, flash drives, etc 34a.

Controller 28 also typically receives a number of inputs and outputs for communicating information externally in addition to the inputs and outputs from the camera pairs 12a, 12b through interface 26. For interface 40 with a user or operator, controller 28 typically includes one or more user input devices 40 (e.g., a keyboard, a mouse, a trackball, a joystick, a touchpad, a keypad, a stylus, and/or a microphone, among others). Controller 28 may also include a display 42 (e.g., a CRT monitor, an LCD display panel, and/or a speaker, among others). The display 44 may include a three-dimensional display, or may include multiple displays for displaying both 3D images as well as 2D data. The interface to controller 28 may also be through an external terminal interface connected directly or remotely to controller 28, or through another computer 36 communicating with controller 28 via a network 38, modem, or other type of communications device. Network 28 may include either wired or wireless types of network communications.

The processor 30 of controller 28 operates under the control of an operating system 46, and executes or otherwise relies upon various computer software applications, components, programs, objects, modules, data structures, etc. (e.g. image processing algorithms 48). The image processing algorithms 48, which will be presented in more detail below, may be used to enhance or fuse images from the different cameras 14a, 14b, 16a, 16b, for example. Controller 28 communicates on the network 38 through a network interface 50.

In general, the routines executed to implement the image processing portion of the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory 32 and storage devices 34 in the controller 28, and that, when read and executed by one or more processors 30 in the controller 28, causes that processor 30 to perform the steps necessary to execute steps or elements embodying the various aspects of the invention. Moreover, while the invention has and hereinafter will be described in the context of fully functioning controllers and computation systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to non-transitory physical, recordable type media such as volatile and non-volatile memory devices such as flash drives, for example, floppy and other removable disks, hard disk drives, optical disks (e.g., CD-ROM's, DVD's, etc.), among others; and transmission type media such as digital and analog wired or wireless communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary control environment illustrated in FIG. 1 is not intended to limit the present invention. Indeed, those skilled in the art will recognize that other alternative hardware and/or software environments may be used without departing from the scope of the invention.

Figure 2A:
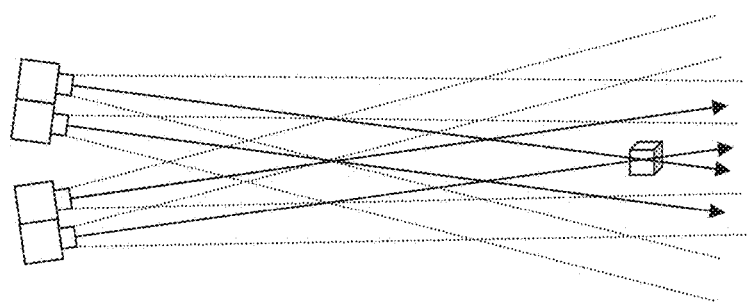
FIGS. 2A, 2B are diagrams illustrating ortho-stereoscopic convergence on far and near objects respectively.
Figure 2B:
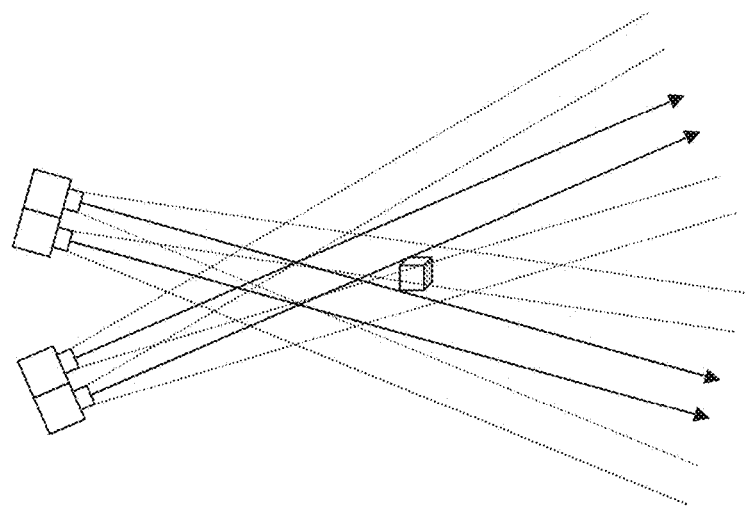
Figure 3:
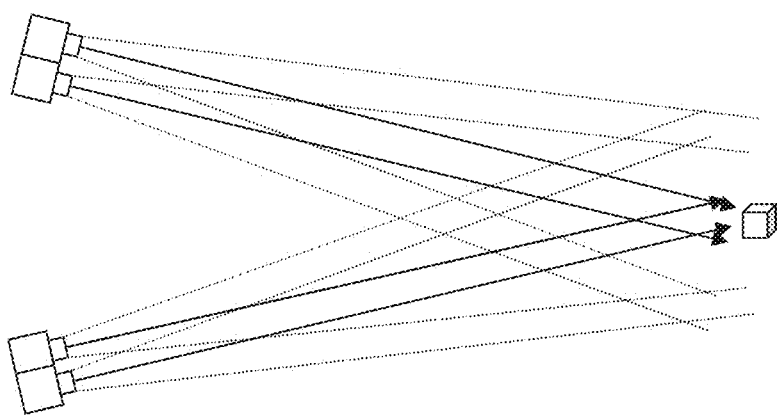
FIG. 3 is a diagram illustrating hyper-stereoscopic convergence.
Figure 4:
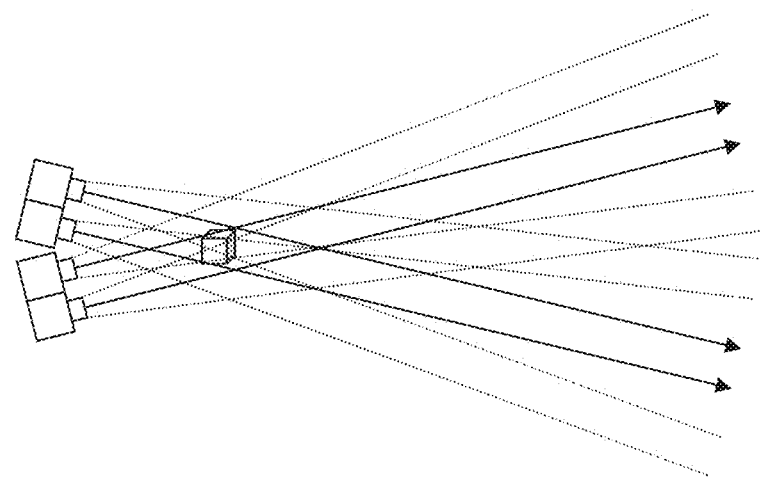
FIG. 4 is a diagram illustrating micro-stereoscopic convergence.
Figure 5:
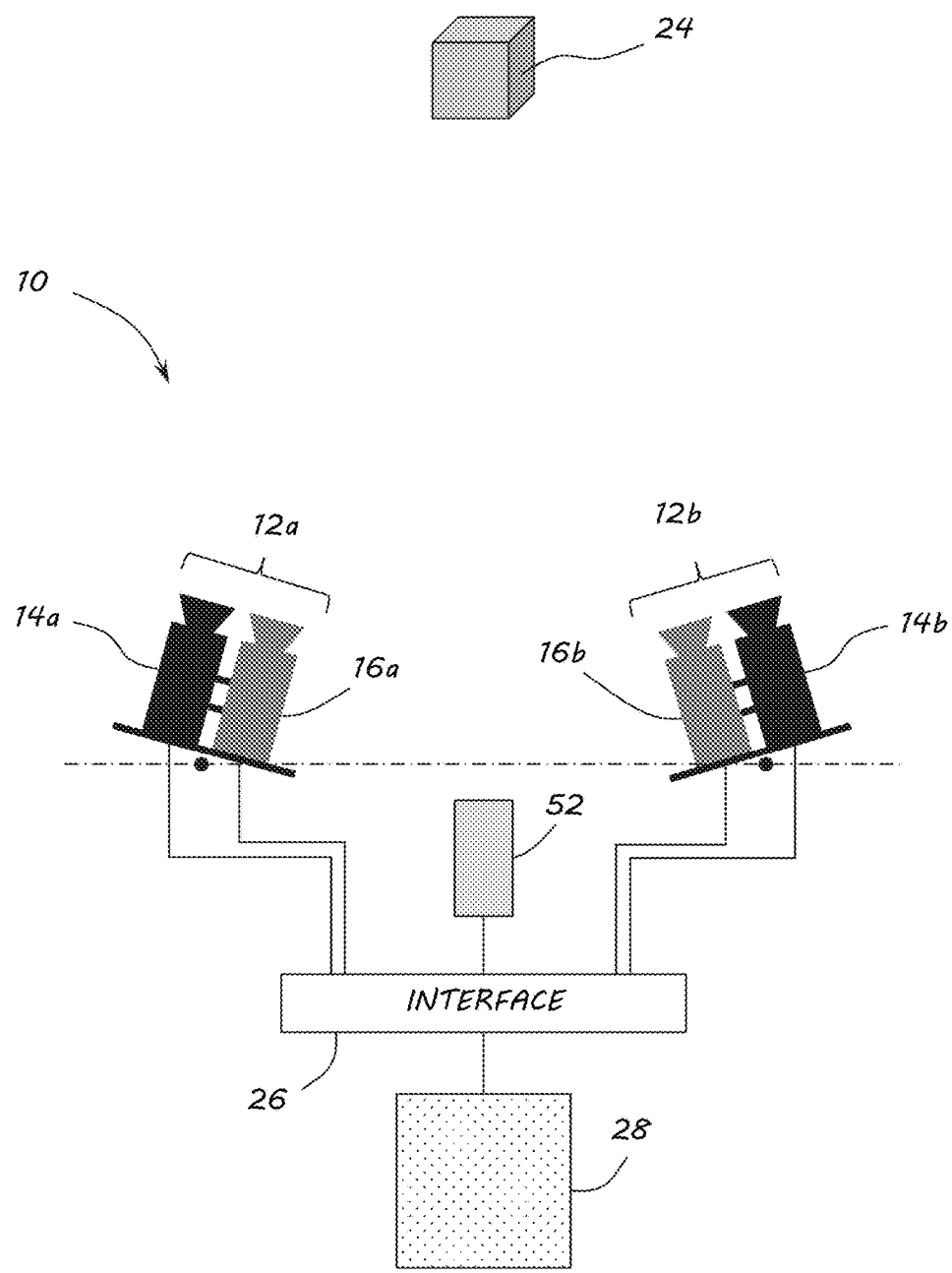
FIG. 5 is a schematic diagram of the system of FIG. 1 focused on a far object or scene.
Figure 6:
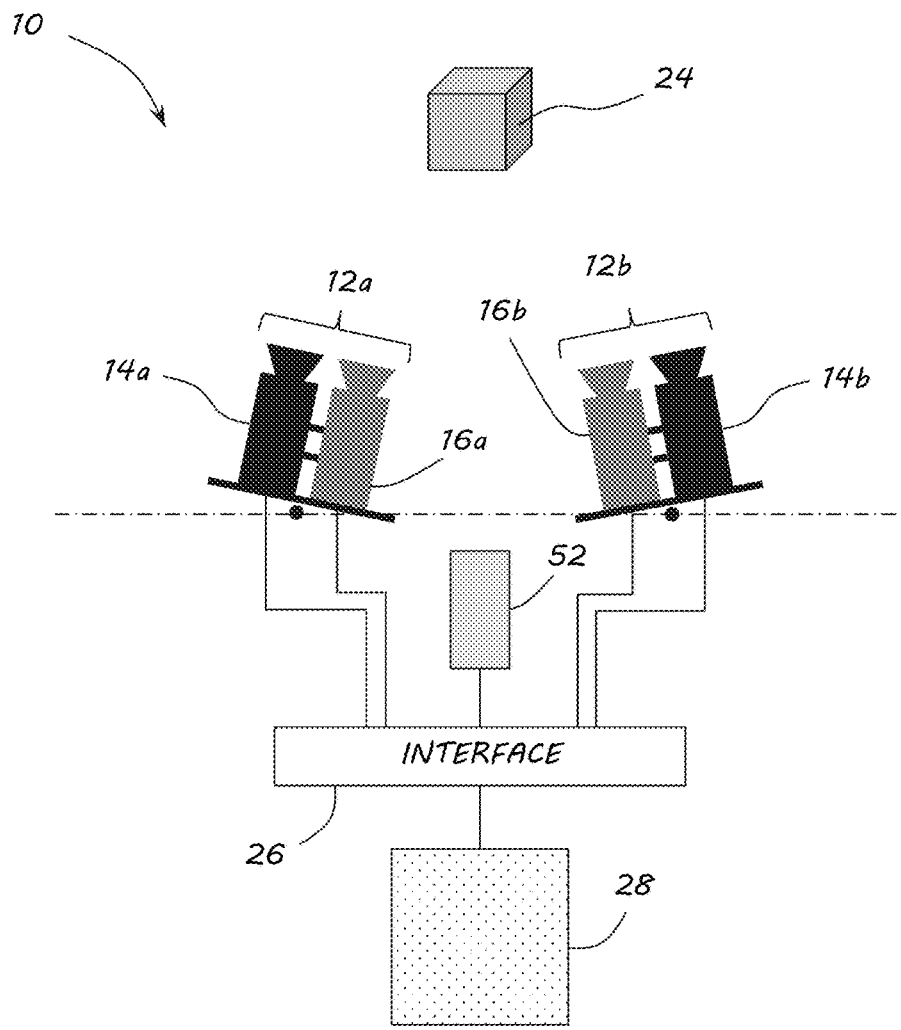
FIG. 6 is another schematic diagram of the system of FIGS. 1 and 5 with altered geometry, focused on the object or scene.
Figure 7:
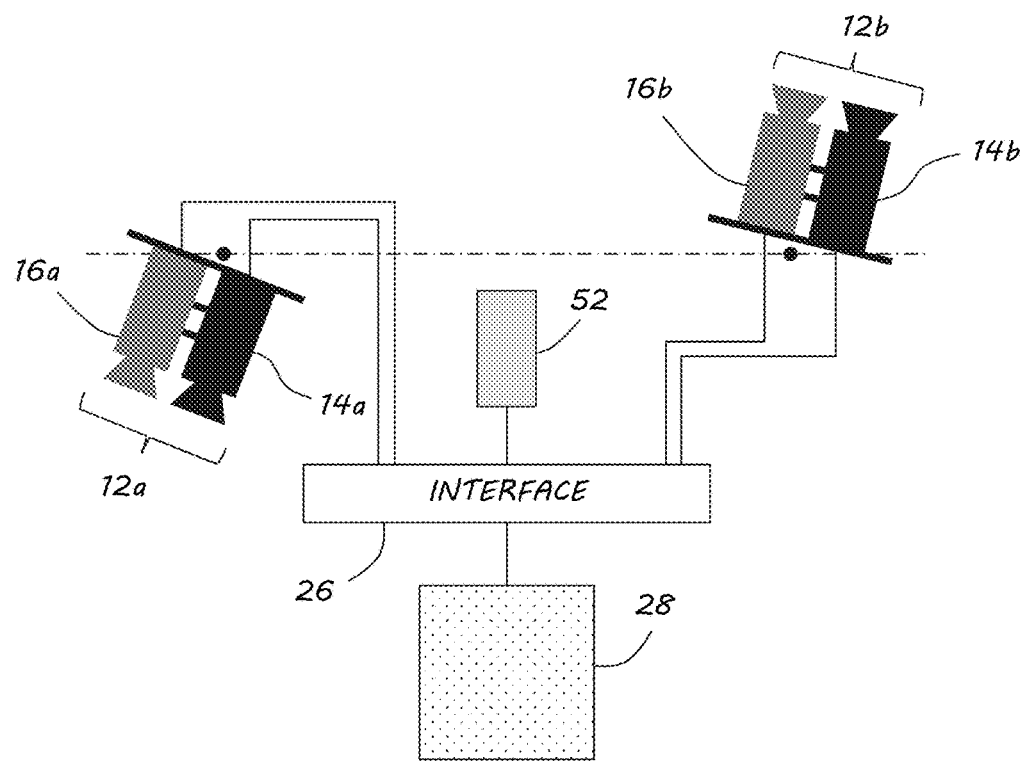
FIG. 7 is another schematic diagram of the system of FIGS. 1, 5, and 6 with the camera pairs positioned for a larger field of view.

The pairs of matched multispectral sensors of the camera pairs 12a, 12b have an added feature of having continuously variable inter-sensor distances via pivoting and translating to introduce ortho-, hyper-, and micro-stereoscopic capabilities. Ortho-stereopsis sensor spacing corresponds to an average inter-pupillary distance of human eyes (66 mm) to mimic and afford normal stereoscopic vision. Examples of ortho-stereopsis may be seen in FIGS. 2A and 2B where ortho-stereoscopic views are converged on far and near objects, respectively. Hyper-stereopsis is equivalent to setting an observer's eyes further apart (>70 mm) to provide enhanced stereo depth cues for very distant objects, as illustrated in FIG. 3. Micro-stereopsis is equivalent to setting an observer's eyes closer together (<60 mm) to provide enhanced stereoscopic depth cues for very close viewing distances of small objects, as illustrated in FIG. 4. Examples of the flexible positioning may be seen schematically in FIGS. 5 and 6. Additionally, in some embodiments, a separate range finder 52 may be employed to assist in focusing the camera pairs 12a, 12b on a particular object. Additionally, the pairs of cameras 12a, 12b may, in some embodiments, be directed away from each other to increase the overall field of view and then focused on a particular object or area of interest when required as illustrated in FIG. 7.

Figure 8:
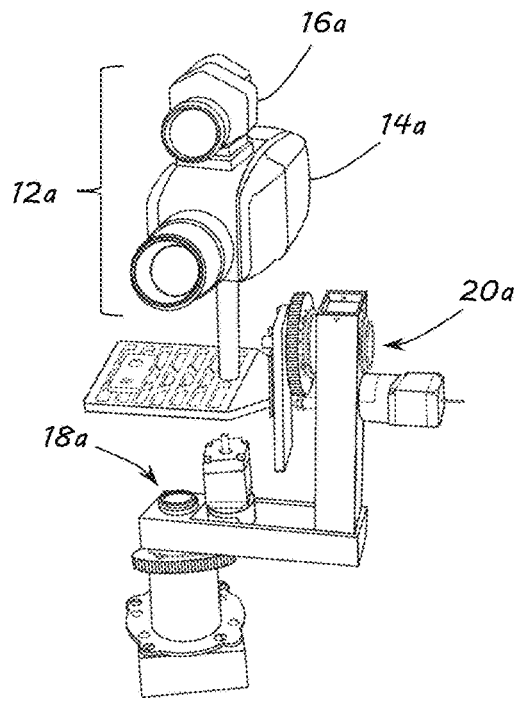
FIG. 8 is a representation of a specific camera pair for an embodiment of the invention.
Figure 9:
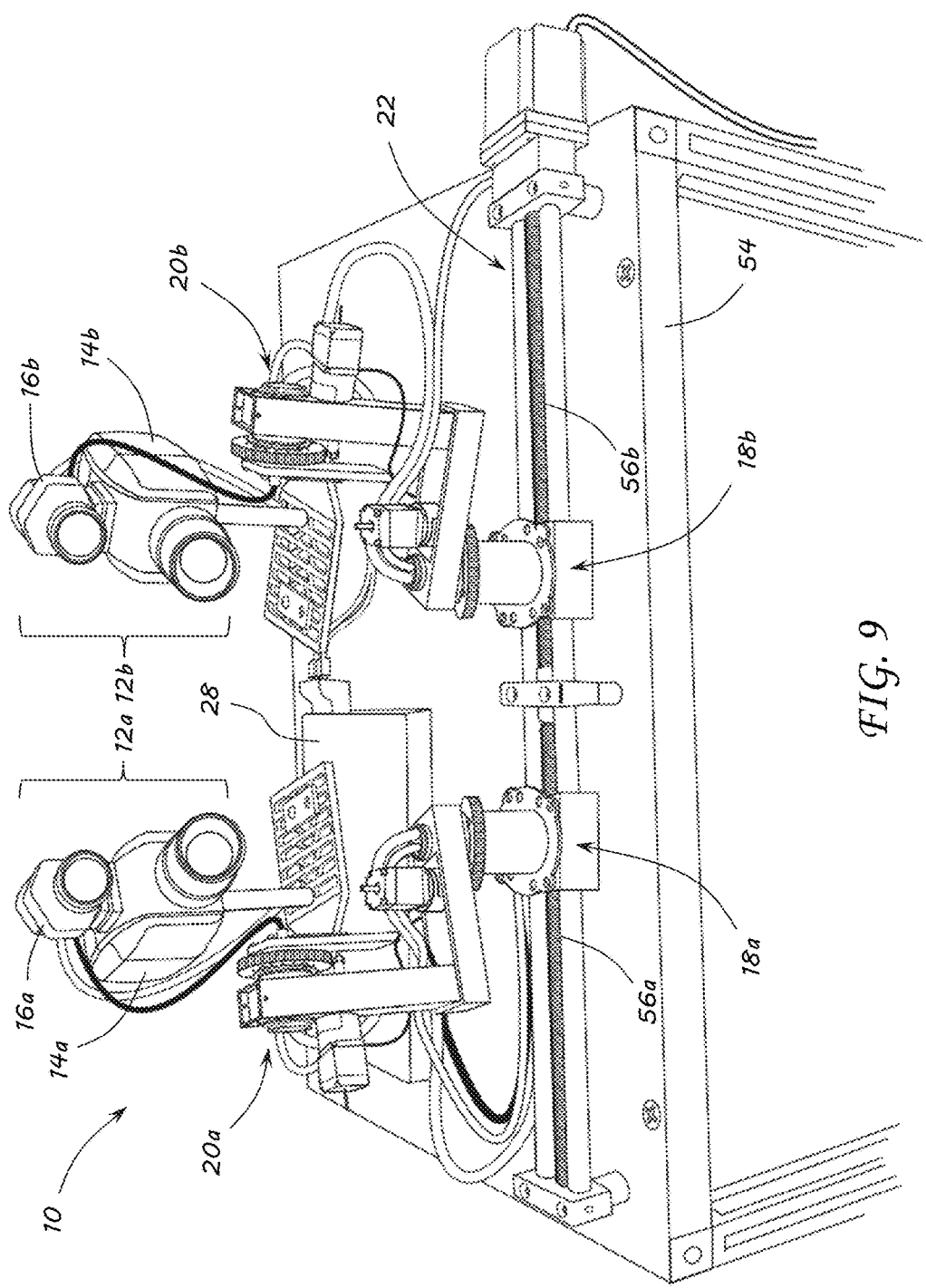
FIG. 9 is a representation of the system of FIG. 1 on a moving cart.
Figure 10:
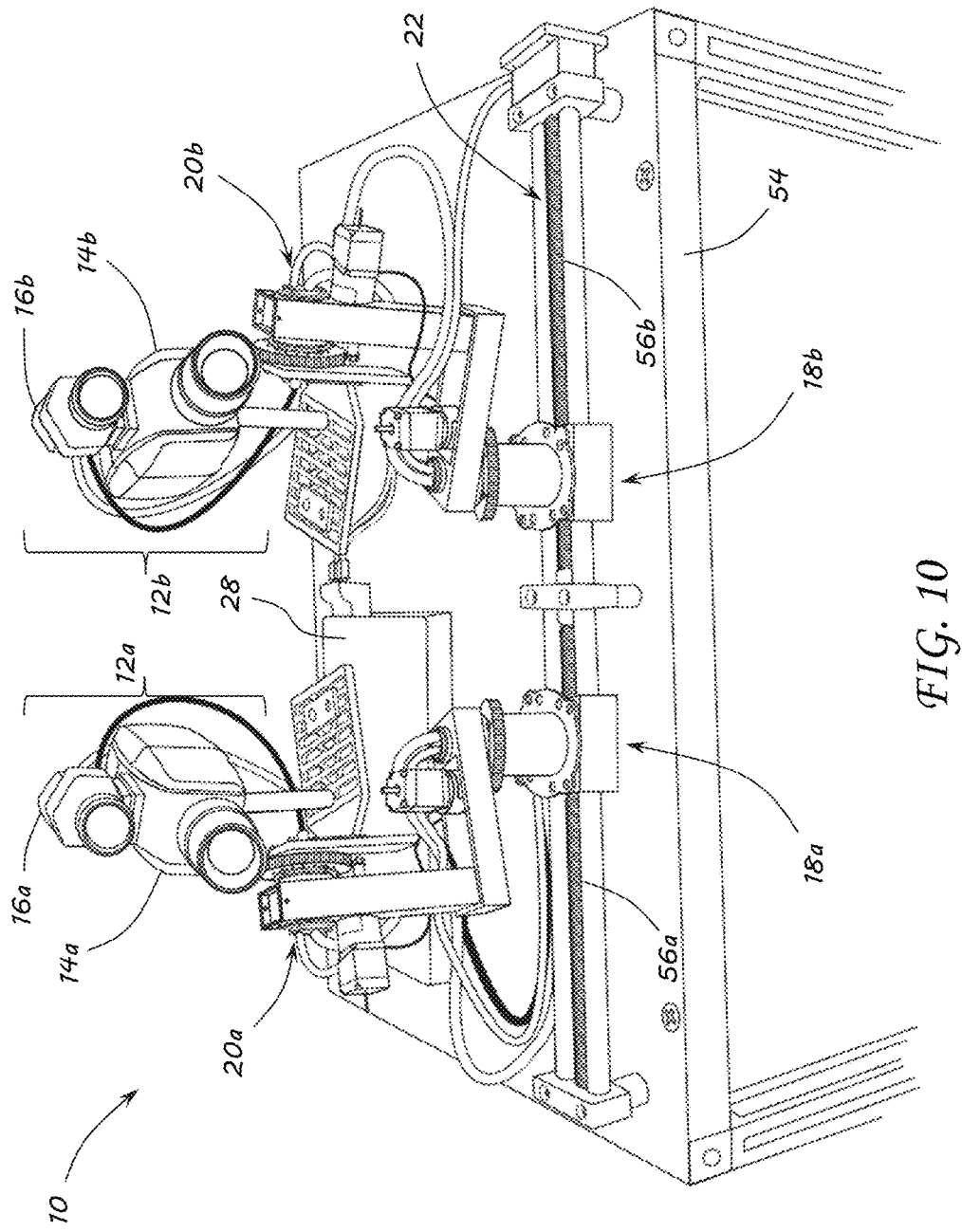
FIG. 10 is a representation of the system in FIG. 9 with camera pairs adjusted for a wider field of view.
Figure 11:
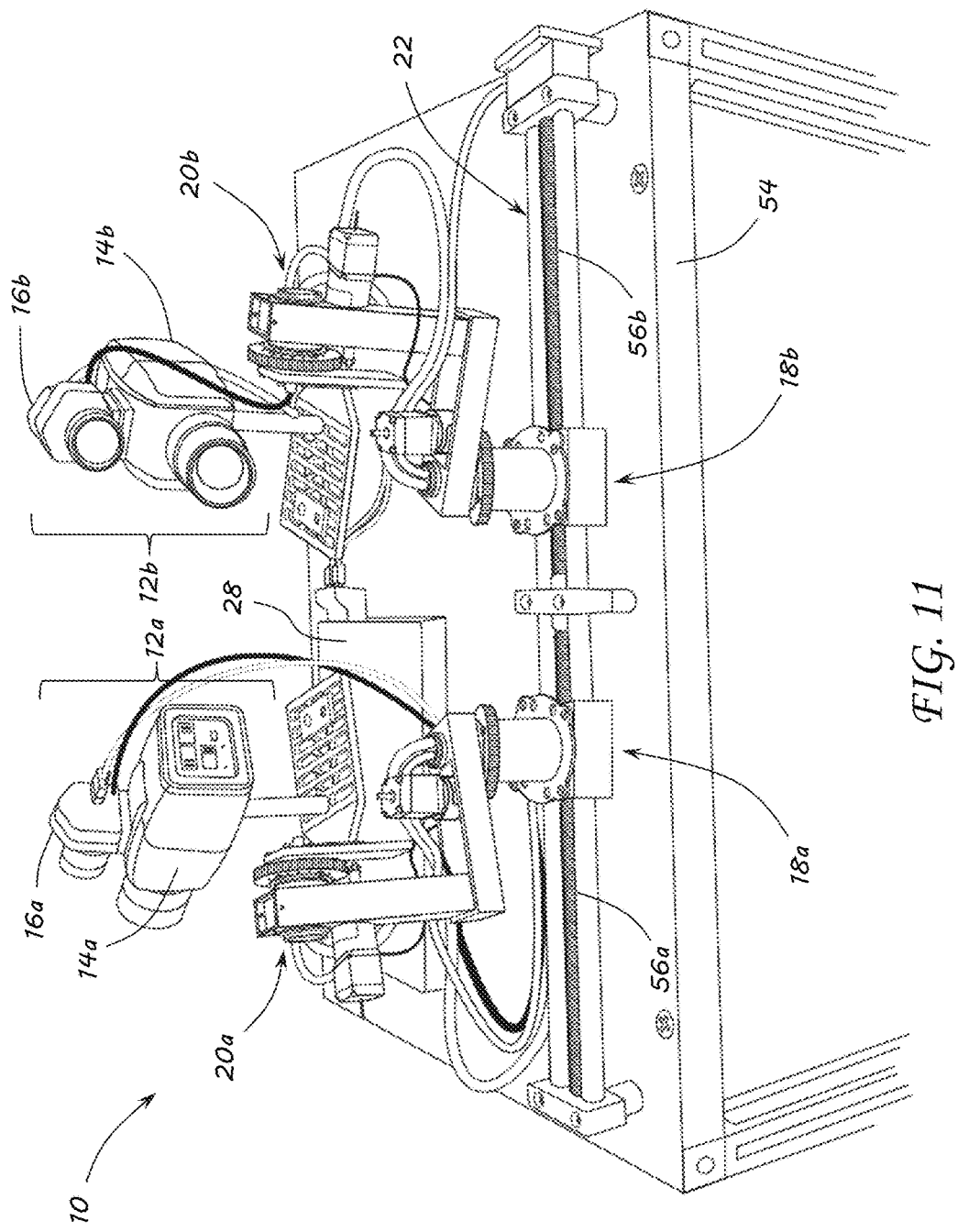
FIG. 11 is another representation of the system in FIG. 9 with the camera pairs adjust for forward and aft viewing.
Figure 12:
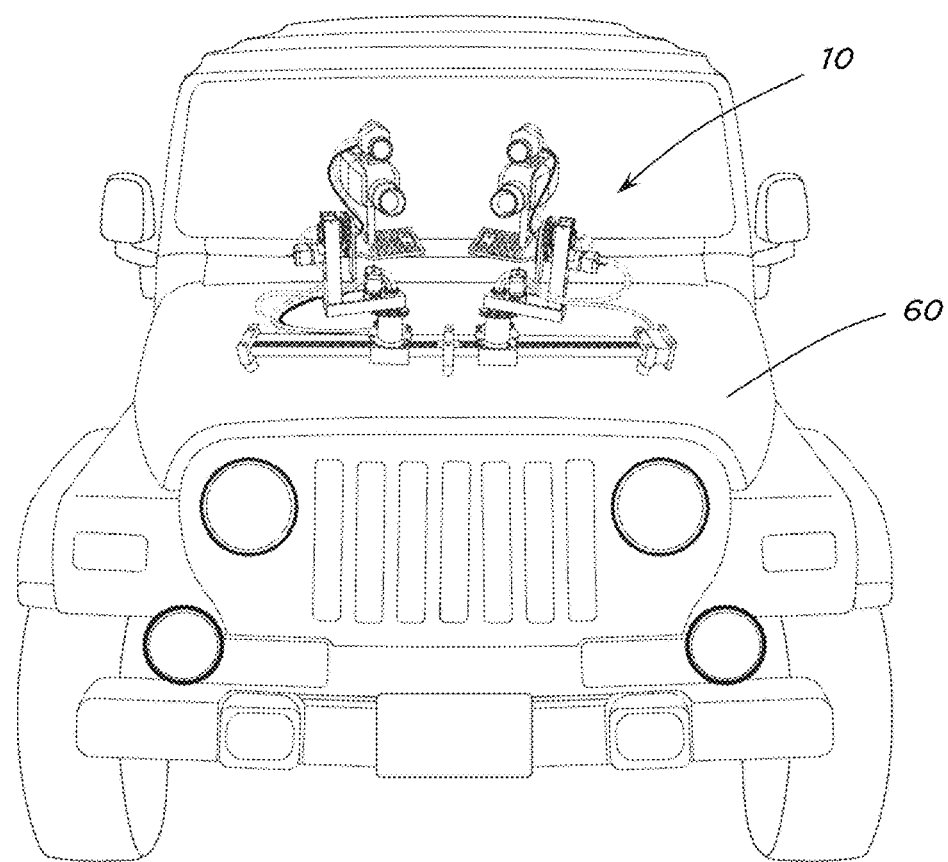
FIG. 12 is a representation of the system of FIG. 1 mounted on a manned vehicle.
Figure 13:
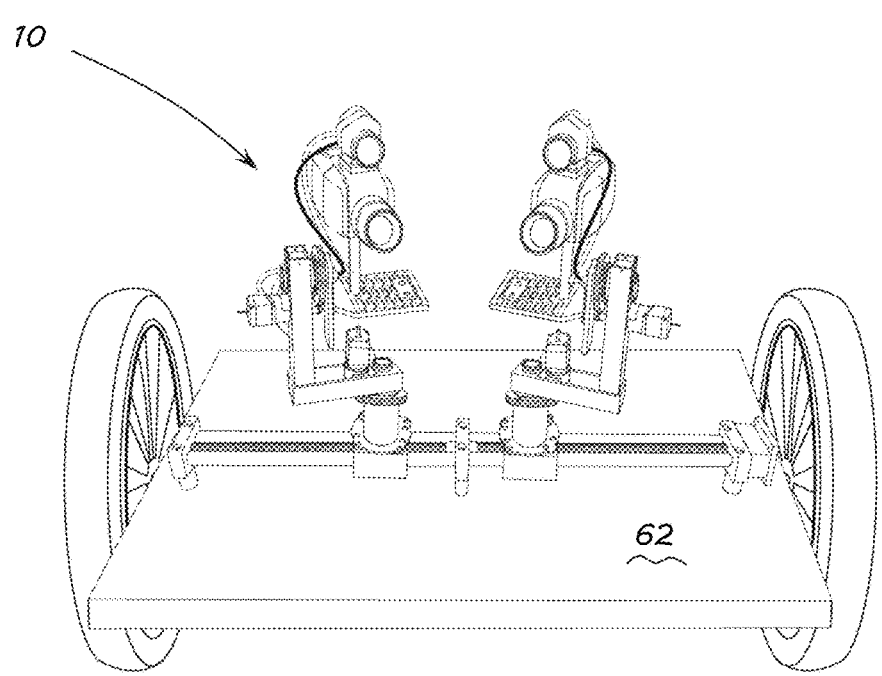
FIG. 13 is a representation of the system of FIG. 1 mounted on an unmanned vehicle.

Turning now to FIGS. 8 and 9, these figures illustrate a specific embodiment of the invention implemented on a movable cart 54. The camera pair 12a, 12b in this specific embodiment consist of 3D color visible spectrum cameras 14a, 14b coupled with 3D thermal cameras 16a, 16b. Stepper motors are used to rotate the camera pairs 12a, 12b about pivot points 18a, 18b. These motors may be synchronized when focusing on an object or particular scene. They may also work independently when working to expand the viewing area such as in FIG. 10, or for a forward and rearward view such as in FIG. 11. A stepper motor may also be coupled to a screw drive, which moves the camera pairs 12a, 12b along path 22. The screw drive may be synchronized, as in the figure, to simultaneously move the camera pairs 12a, 12b toward or away from each other. In this embodiment, the screw threads 56a and 56b may be oppositely pitched in order to achieve the synchronized motion with one stepper motor. In other embodiments two separate screw drives, each with its own stepper motor may be used to independently drive the camera pairs. In yet other embodiments, other drive mechanisms may be used to translationally move the camera pairs 12a, 12b. Stepper motors may also be used to adjust the elevation of the camera pairs 12a, 12b, pivoting the pairs about axis 20a, 20b. In these illustrated embodiments, a laptop computer serves as both the interface 28 and controller 28. While the embodiments in FIGS. 8-11 were mounted on a movable cart, other embodiments of the invention may be mounted on other moving vehicles, such as a jeep 60 or other type of automobile, SUV, or truck as in FIG. 12, or on an autonomous or remotely controlled vehicle, such as a SEGWAY® like platform 62 as in FIG. 13.

Figure 14:
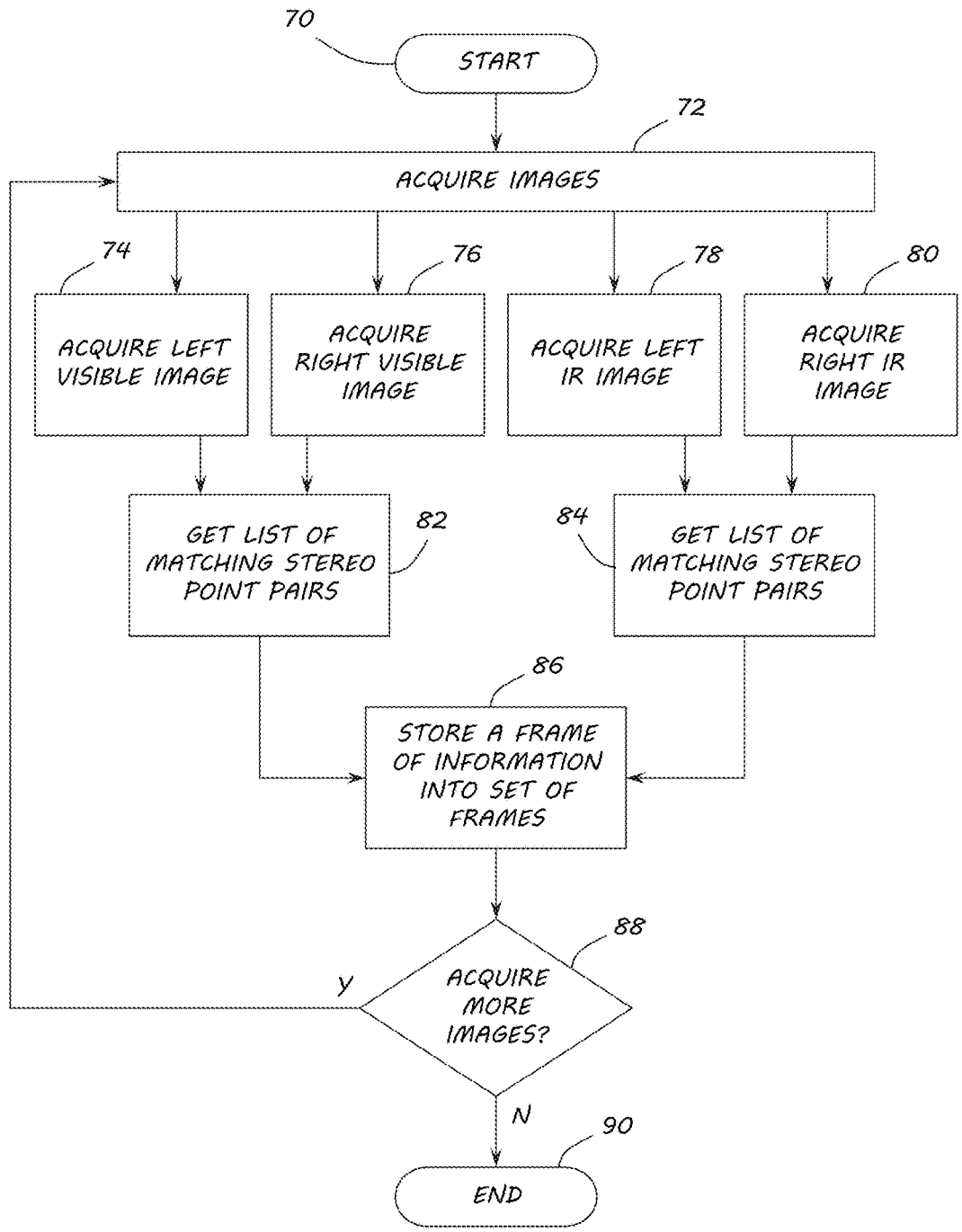
FIG. 14 is a flow diagram for acquiring images consistent with embodiments of the invention.

The controller 28 processes the images acquired by the camera pairs 12a, 12b for display on the 3D display 44 (or other type of display in other embodiments). The process begins at block 70 in FIG. 14. Image frames are acquired at block 72. The acquisition process includes acquiring an image from each camera 14a, 14b, 16a, 16b in the system 10. In the illustrated embodiment above, a separate from image is acquired for a left visible image in block 74, a right visible image in block 76, a left thermal image in block 78, and a right thermal image in block 80. Stereo point pairs are matched in block 82 for the visible images and stereo points are matched in block 84 for the thermal images. These images and matched points and sensor geometry are stored in block 86 as a set of frames. The number of frames stored in a set may vary from embodiment to embodiment. In this illustrated embodiments, the set of frames is limited to a few seconds of image capture. If additional frames are to be acquired for the set ("Yes" branch of decision block 88), then the process continues at block 72. Otherwise ("No" branch of decision block 88), the process completes as block 90.

Figure 15A:
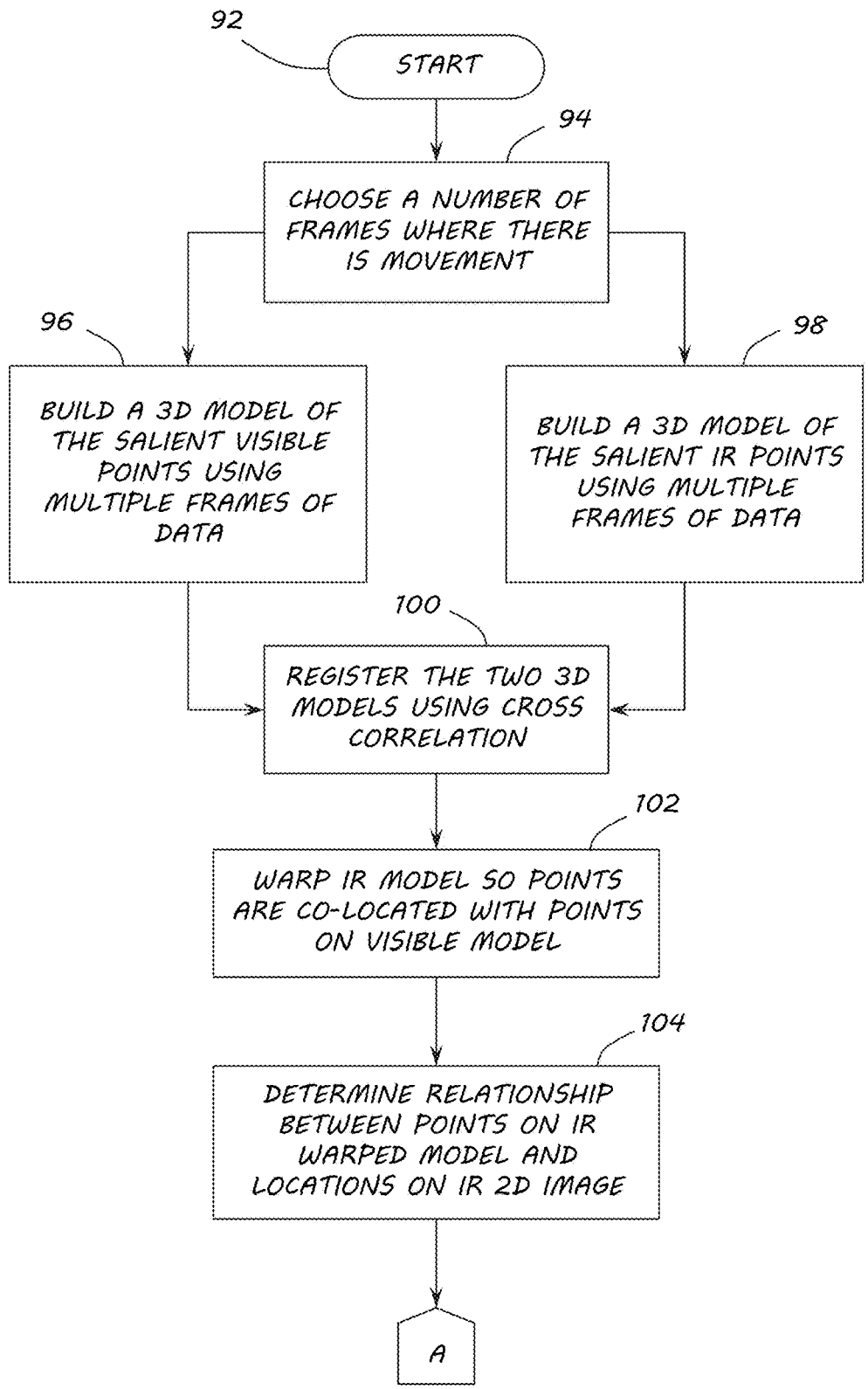
FIGS. 15A, 15B contain a flow diagram for processing the images acquired in FIG. 14 for display on a 3D display.
Figure 15B:
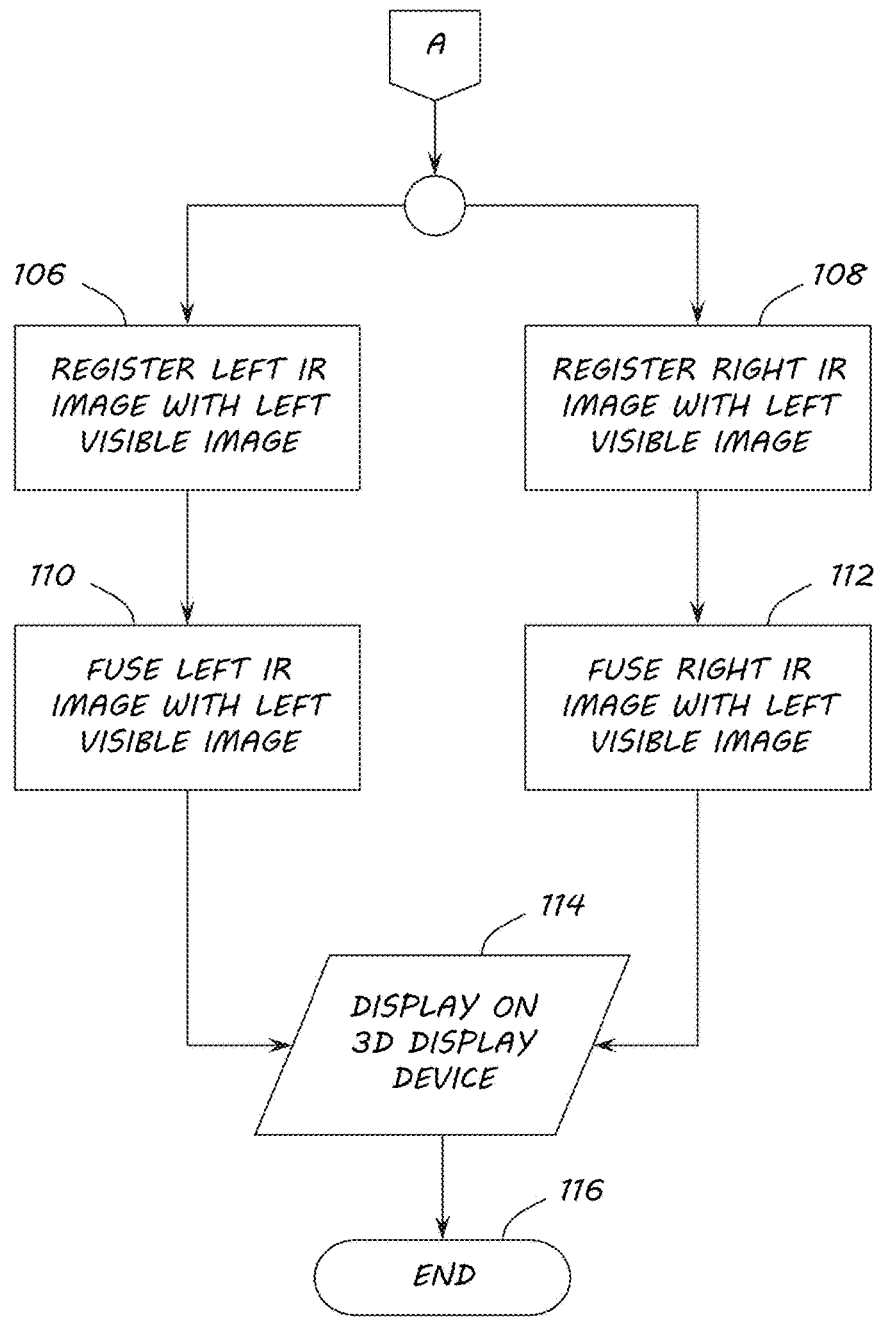

After acquisition of the sets of frames, the controller may then process those frame staring at block 92 in FIGS. 15A-15B. Processing of the sets of frames may occur, in some embodiments, in parallel with the acquisition of additional sets of frames. The process begins with choosing a number of frames where there is movement in block 94. The may occur when there are changes in the system/sensor geometry between frames. Then 3D models are built of the salient points using multiple frames of data for the visible and thermal frames in blocks 96 and 98. These two models are registered using cross correlation in block 100. The thermal model is then warped in order to co-locate with corresponding points on the visible model in block 102. After warping, a relationship between points on the thermal warped model and locations in a thermal 2D image are determined in block 104.

Figure 16B:
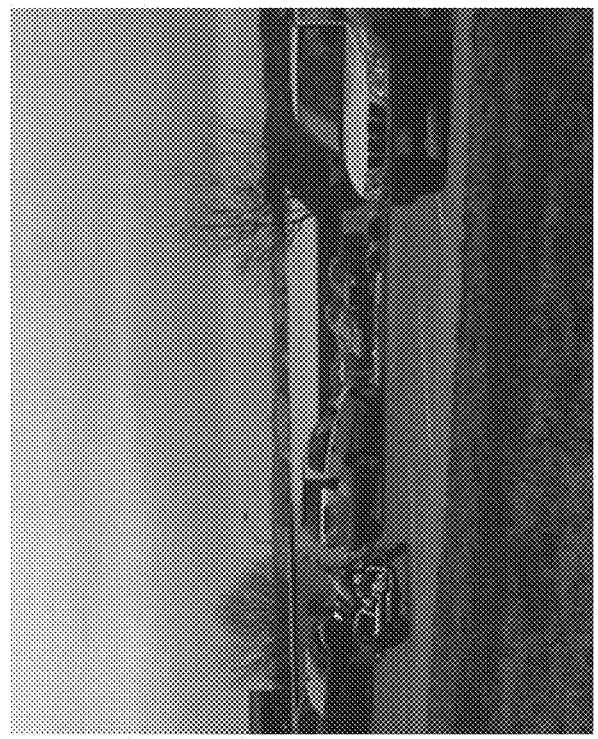
FIGS. 16A, 16B are exemplary left and right eye images from a visible spectrum camera.
Figure 16A:
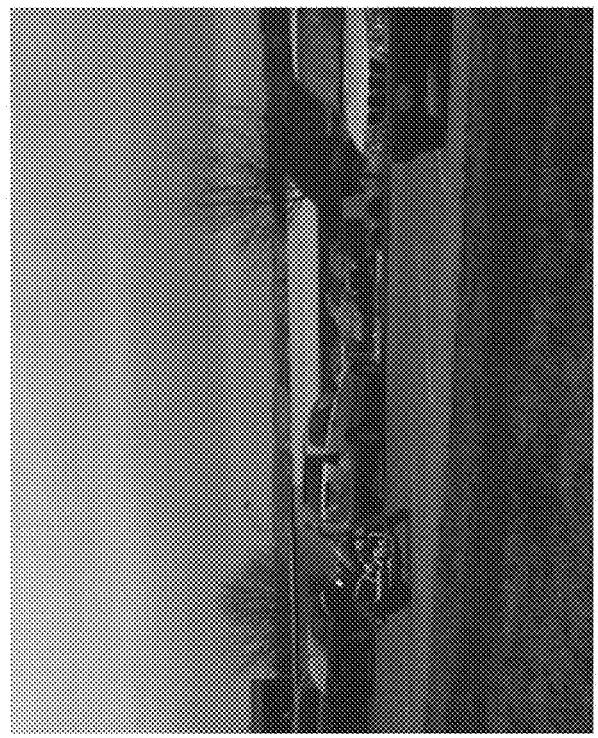
Figure 17B:
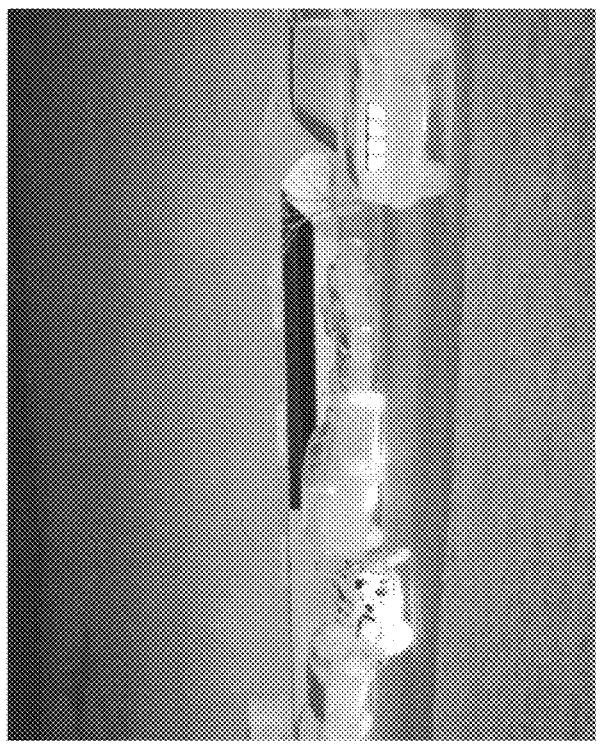
FIGS. 17A, 17B are exemplary left and right eye images from a thermal spectrum camera (sensor)
Figure 17A:
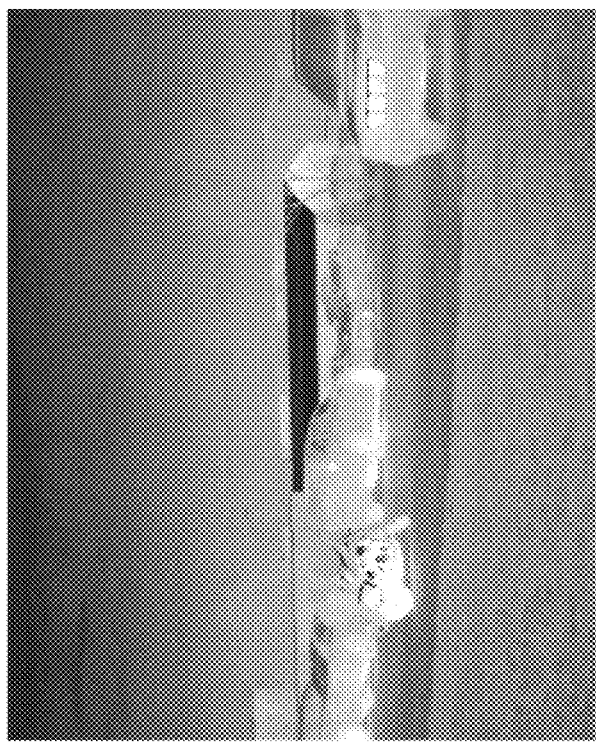
Figure 18B:
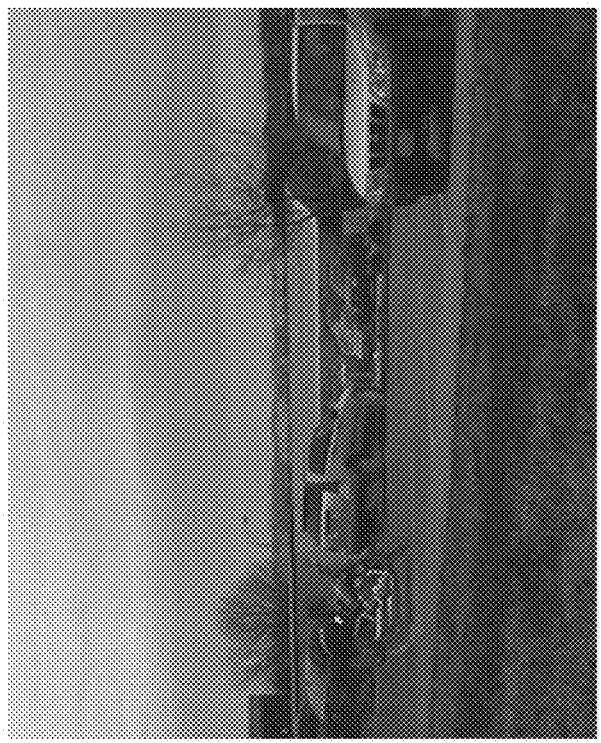
FIGS. 18A, 18B are exemplary left and right eye images of fused visible and thermal images.
Figure 18A:
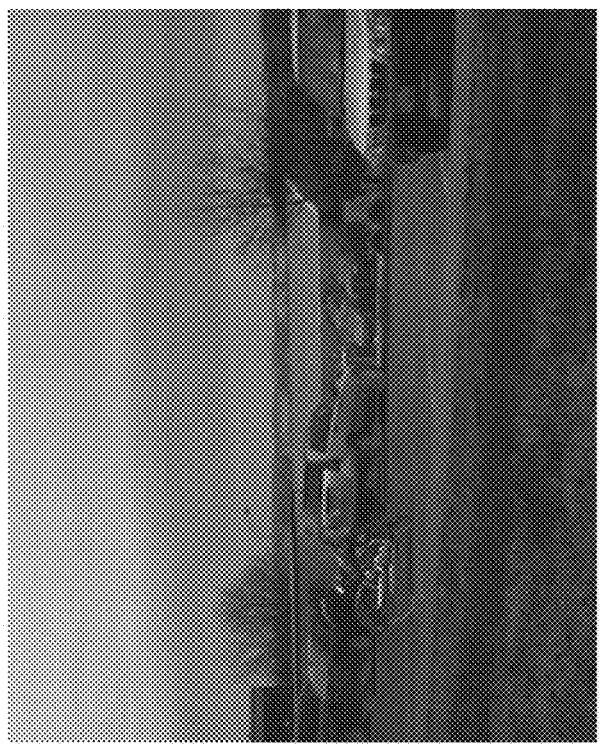

The left and right thermal images are then registered with the left and right visible images in blocks 106 and 108. Then the left and right thermal and visible images are fused in blocks 110 and 112. These left and right images are then displayed on the 3D display in block 114. The process ends at block 116, or may be repeated for the next set of frames starting at block 94. Results of the image fusing may be seen in FIGS. 16A, 16B, 17A, 17B, and 18A, 18B. FIGS. 16A and 16B are a reproduction of left and right visual images that could have been captured by cameras 14a and 14b. FIGS. 17A and 17B are a reproduction of left and right thermal images that could have been captured by thermal cameras 16a and 16b. The resulting fused left and right images can be seen in FIGS. 18A and 18B, illustrating the enhanced images that would be provided to a user on a 3D display. As can be seen in FIGS. 18A and 18B the warmer areas identified in the thermal images are represented in the visual model as red, showing residual heat in the vehicles parked in the lot, which could be used by a user of the system to make tactical or other decisions.

Figure 19:
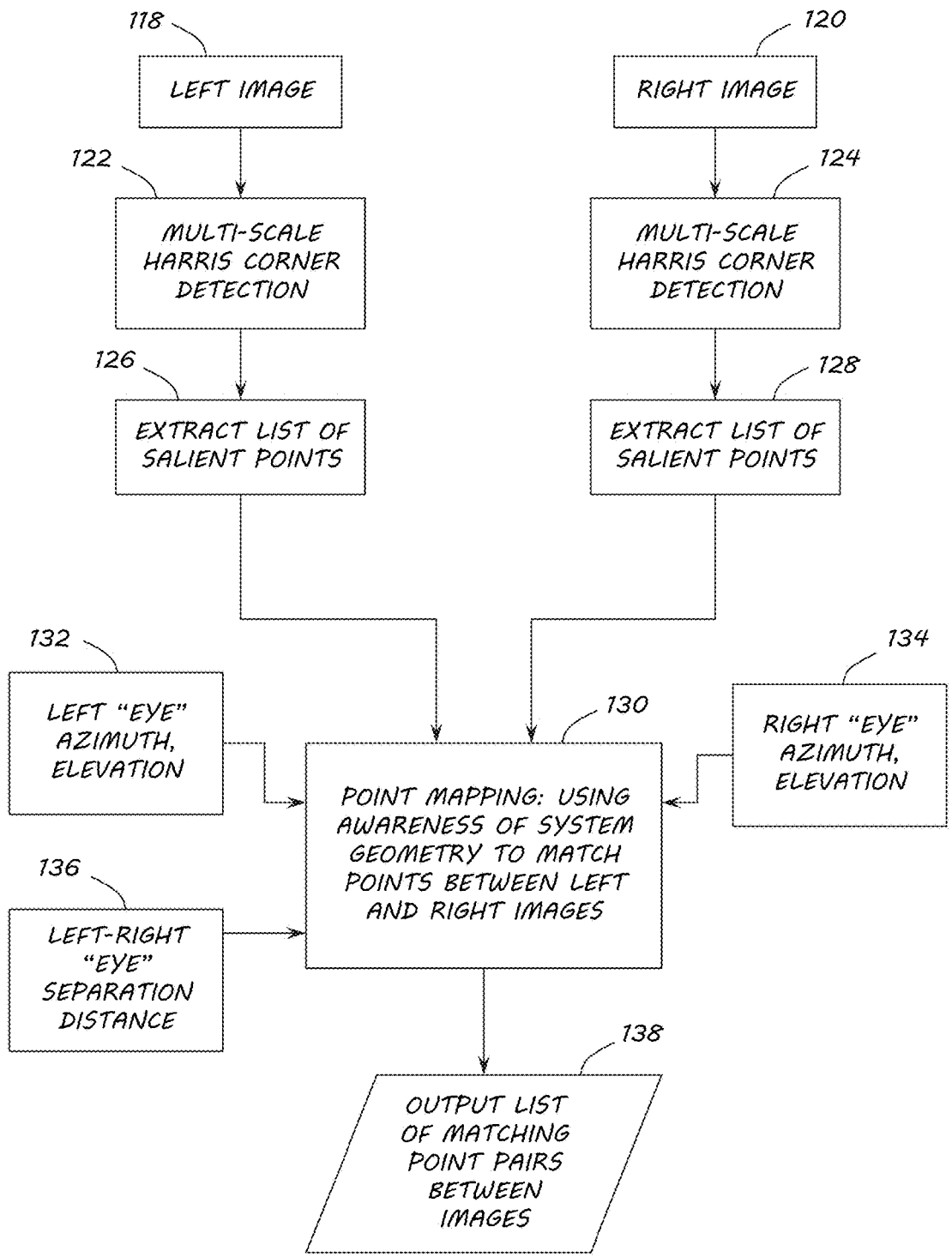
FIG. 19 is a flow diagram for mapping points of images acquired in FIG. 14.

In one embodiment, getting the list of matching stereo point pairs (blocks 82 and 84 of FIG. 14) may be accomplished using the method in FIG. 19. Starting with the left and right images 118, 120 multi-scale Harris corner detection is performed in blocks 122 and 124. From this detection, a list of salient points is extracted for each image in blocks 126 and 128. The salient points are then mapped in block 130. Additional information related to the orientation and spacing of the cameras is also provided to block 130. Information from the cameras such as left "eye" azimuth and elevation are provided from block 132. Right "eye" azimuth and elevation are proved from block 134. And, left-right "eye" separation distance is provided from block 136. After the points are matched in block 130, the matched point pairs are output in block 138.

Figure 20A:
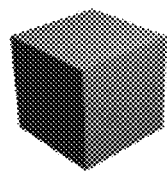
FIGS. 20A, 20B are left and right visible images of an exemplary object.
Figure 20B:
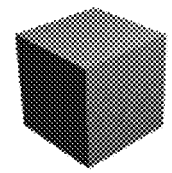
Figure 21A:
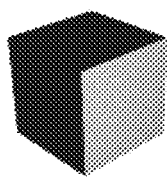
FIGS. 21A, 21B are left and right thermal images of an exemplary object.
Figure 21B:
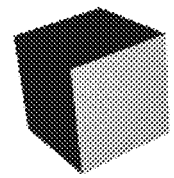
Figure 22:
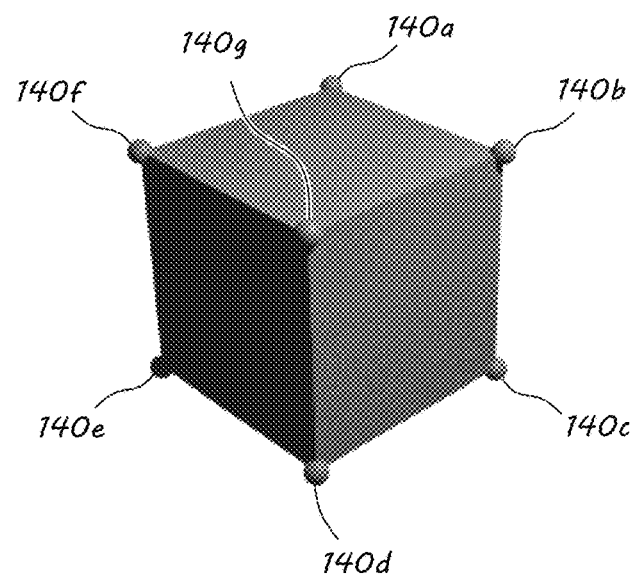
FIG. 22 illustrates salient points detected on the left visible image of FIG. 20A.
Figure 23:
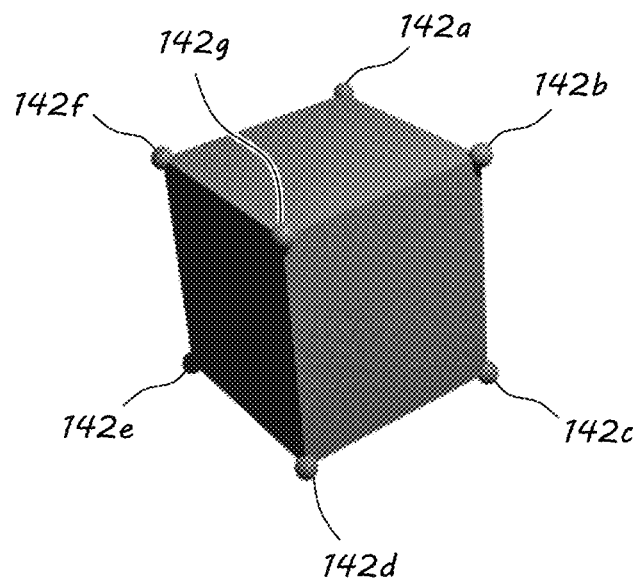
FIG. 23 illustrates salient points detected on the right visible image of FIG. 20B.
Figure 24:
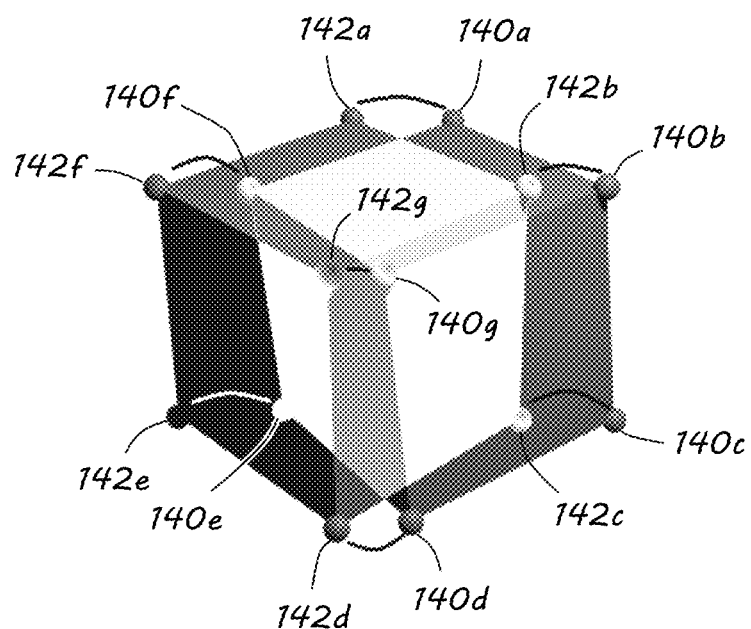
FIG. 24 is illustrates mapping of the salient points between the two images in FIGS. 22 and 23.
Figure 25:
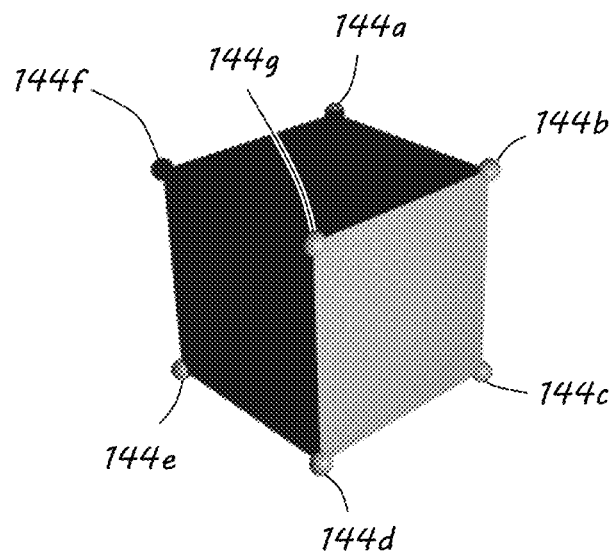
FIG. 25 illustrates salient points detected on the left thermal image of FIG. 21A.
Figure 26:
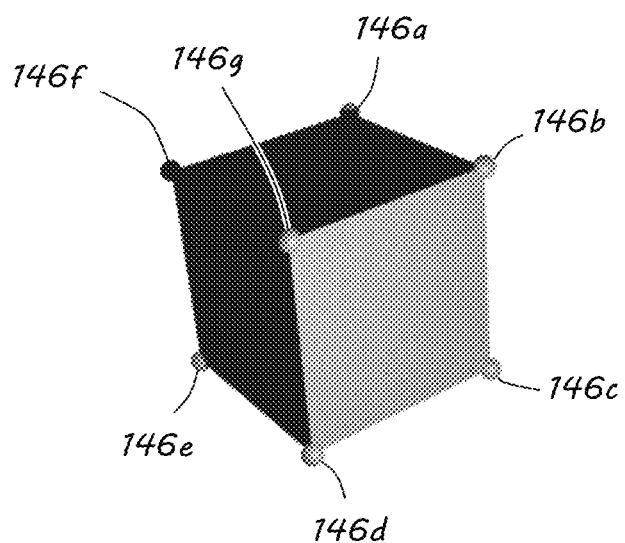
FIG. 26 illustrates salient points detected on the right thermal image of FIG. 21B.

To further illustrate the fusing processes executing on the controller 28 associated with the embodiments of the invention above, these processes will now be explained in relation to the exemplary object 24 in FIGS. 1-5. The controller 28, in some embodiments, is continually acquiring images from the camera pairs 12a, 12b 30 to 60 times per second. The acquisition rate for other embodiments may be more or fewer images, or some embodiments may capture a stationary image for analysis purposes. These images from the two visual cameras 14a, 14b are reproduced in FIGS. 20A and 20B. A list of matching stereo point pairs is then determined for the visible images. A multi-scale Harris Corner Detection is performed on the left image with the salient points 140a-g (corners for this particular object) being illustrated in FIG. 22. Similarly, multi-scale Harris Corner Detection is also performed on the right image with the salient points 142a-g (corners for this particular object) being illustrated in FIG. 23. The corners are converted into a list of points for the left image and the right image. With these two point lists, point mapping is performed. In order to map the points, a set of translation is found (sizing, translating, rotating) that enables most of the points in one list to match the points in the second list. The may be accomplished, in some embodiments, by describing a translation to map a point on one list to a point in the second list and then applying that same translation to all other points to see if they fall on points in the other list. This does not need to be achieved by trying all combination exhaustively. Known geometry of the sensors (azimuth and elevation angles, separation distance) may also be used to determine the exact overlap of the fields of view from each of the cameras (14a,14b for the visual images). This knowledge may assist in ruling out a large amount of potential translations and constrains the problem space to a much narrower field. For example, it may be known that the right camera is to the right of the left camera by a specific distance. It may also be known that the cameras are "toed-in" at an angle to look at a closer focus point or whether the cameras are aligned in parallel (looking to infinity). An example of the point matching for the visual images is illustrated in FIG. 24. Once matched, the list of point pairs for the left and right images are output. Similarly, Harris Corner Detection and point matching (144a-g, 146a-g) of the left and right thermal images is also performed and the matched pairs are output as illustrated in FIGS. 25-27. The outputted pairing information is stored for this particular frame. In some embodiments, it may be necessary to store multiple frames across time so that motion may be used by a concurrent downstream stage to assist in building 3D models from the data. In addition to storing the match points for the visible and thermal images, the geometry associated with the cameras is also stored with the frame.

From the stored sets of frames, a number of frames may be chosen to use for model building. The criterion, in some embodiments, may be to choose frames that display effects of known movement of the camera system. Any changes in the camera or system geometry may constitute movement and may include one or more of the following: change in right camera azimuth, change in left camera azimuth, change in right camera elevation, change in left camera elevation, change in separation distance between right and left cameras, change in system translation, and change in system rotation.

Figure 30:
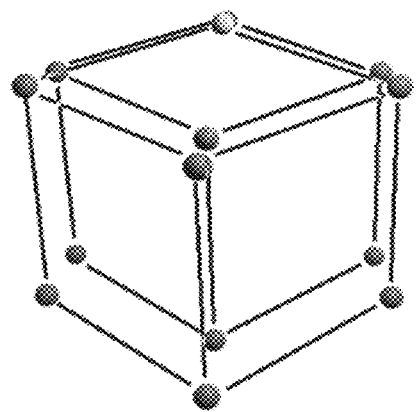
FIG. 30 illustrates the overlaying of the visible and thermal 3D models of FIGS. 28 and 29.
Figure 31:
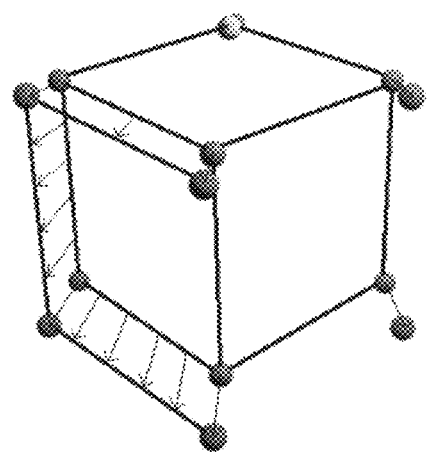
FIG. 31 illustrates warping of the thermal model of FIG. 29 to align with the visible model of FIG. 28.
Figure 32:
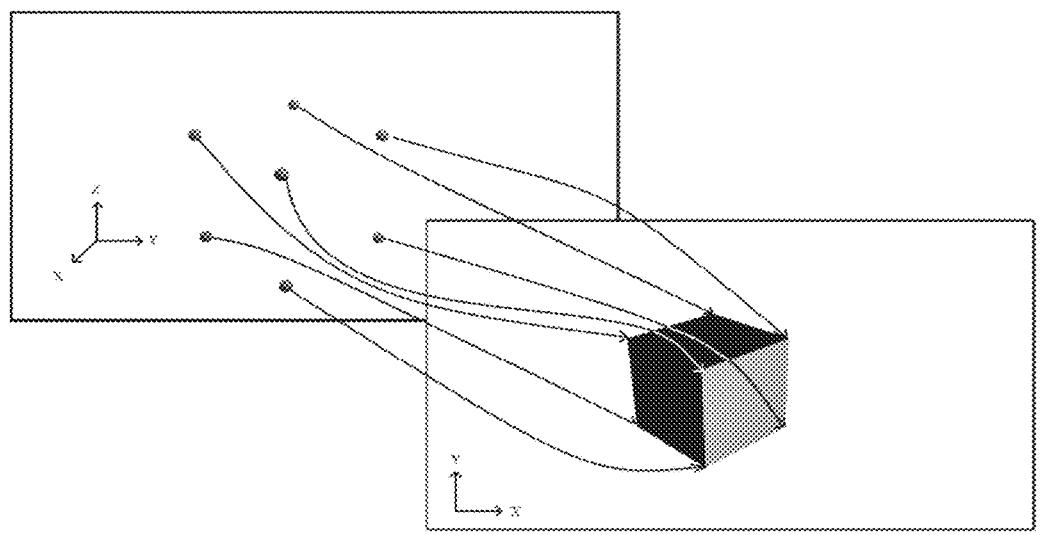
FIG. 32 illustrates reverse mapping the 3D thermal model to a 2D image.

Three dimensional models of the visible and thermal images are built from the points identified above as illustrated in FIGS. 28 and 29. Then, using statistical methods of cross correlation, the thermal 3D model and the visual 3D model are registered. FIG. 30 illustrates the overlaying of the visual 3D model and the thermal 3D model. By registering the thermal 3D model to another model effectively warps the thermal model. This warping generates a set of equations and coefficients to be applied in localized patches over the thermal model. This effectively creates a mapping of 2D points in the imagery to 3D points in the volume of the model. The warping of the thermal model is illustrated in FIG. 31. The equations and coefficients above may also be applied in a reverse manner to map 3D points in the volume of the model to points in the 2D imagery as illustrated in FIG. 32.

Figure 33:
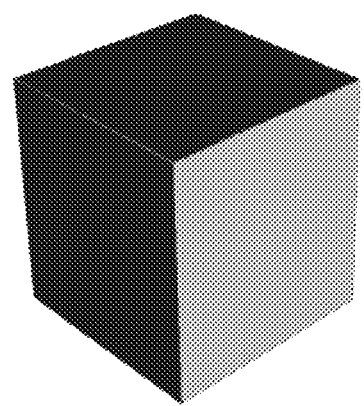
FIG. 33 illustrates the warped 2D thermal image.
Figure 34:
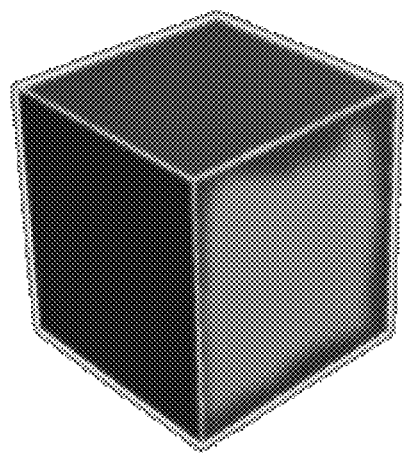
FIG. 34 illustrates the left thermal image fused with the left visible image.

Using the reverse mapping above, the 3D thermal points in the registered thermal model are mapped back to points in the 2D thermal imagery for the left camera 16a. This will warp the left thermal image and it will now be registered with the left visible image as illustrated in FIG. 33. Similar the mapping of 3D points for the right image from the right camera 16b is also performed. Then, in some embodiments, Laplacian Pyramid Fusion or Discrete Wavelet Fusion may be used to fuse the left IR and left visible images into a single left channel image as illustrated in FIG. 34. The same functions are performed on the right images and then the left and right channels may be displayed to a user on a 3D display device.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. While the term camera has been used to describe devices generating images to be captured, the term camera may just as easily be replaced with a sensor that is also capable of producing images of an object, scene, or particular field of view. The invention in its broader aspects is therefore not limited to the specific details, representative apparatus and method, and illustrative examples shown and described. Accordingly, departures may be made from such details without departing from the scope of the general inventive concept.

What is claimed is:

1. A mobile three-dimensional sensor configuration, comprising:
   a first sensor of a first type;
   a first sensor of a second type mounted proximate to the first sensor of the first type;
   a second sensor of the first type;
   a second sensor of the second type mounted proximate to the second sensor of the first type;
   the first sensors of the first and second types coupled to a first platform operable to vary the azimuth and elevation of the first sensors of the first and second types;
   the second sensors of the first and second types coupled to a second platform operable to vary the azimuth and elevation of the second sensors of the first and second types;
   the first and second platforms mounted on a translational drive, the translational drive configured to independently translate the first and second platforms with respect to one another; and
   a controller configured to receive images from the first and second sensor of the first type and the first and second sensor of the second type;
   the controller further configured to create a pair fused images of the first sensors of the first and second type and the second sensors of the first and second type; and
   a display,
   wherein the controller still further configured to display the pair of fused images on the display.

2. The mobile three-dimensional sensor configuration of claim 1, wherein the display is a three-dimensional display.

3. The mobile three-dimensional sensor configuration of claim 1, wherein the controller is further configured to adjust the translation, azimuth, and elevation of the first and second platforms.

4. The mobile three-dimensional sensor configuration of claim 1, wherein the mobile three dimensional sensor configuration is incorporated into a manned vehicle.

5. The mobile three-dimensional sensor configuration of claim 1, wherein the mobile three dimensional sensor configuration is incorporated into an unmanned vehicle.

6. The mobile three-dimensional sensor configuration of claim 5, wherein the unmanned vehicle is an autonomous vehicle.

7. The mobile three-dimensional sensor configuration of claim 1, where the first and second sensors of the first type are selected from a group consisting of: a visible (VIS) spectrum camera, a low-light-level (LLL) TV camera, a near infrared (NIR) sensor, a short-wave infrared (SWIR) sensor, a medium-wave infrared (MWIR) sensor, a long-wave infrared (LWIR; thermal) sensor, and combinations thereof.

8. The mobile three-dimensional sensor configuration of claim 7, wherein the first and second sensors of the second type are selected from a group consisting of: a visible (VIS) spectrum camera, a low-light-level (LLL) TV camera, a near infrared (NIR) sensor, a short-wave infrared (SWIR) sensor, a medium-wave infrared (MWIR) sensor, a long-wave infrared (LWIR; thermal) sensor, and combinations thereof.

9. The mobile three-dimensional sensor configuration of claim 1, wherein the controller comprises:
  a memory;
  a processor; and
  program code resident in the memory and configured acquire images from the first and second sensors of the first and second types, the program code further configured, when executed by the processor, to:
    acquire individual images from the first sensor of the first type;
    the first sensor of the second type, the second sensor of the first type, and the second sensor of the second type;
    determine a list of matching stereo point pairs between the images from the first sensor of the first type and the second sensor of the first type;
    determine a list of matching stereo point pairs between the images from the first sensor of the second type and the second sensor of the second type; and
    store a frame of information including the images and the lists of matched point pairs into a set of frames.

10. The mobile three-dimensional sensor configuration of claim 9, wherein the program code is further configured to display acquired images, the program further configured, when executed by the processor, to:
  choose a number of frames from the set of frames where there is movement;
  build a three-dimensional model of salient points of the images from the first sensor of the first type and the second sensor of the first type using multiple frames of data from the set of frames;
  build a three-dimensional model of salient points of the images from the first sensor of the second type and the second sensor of the second type using multiple frames of data from the set of frames;
  register the two three-dimensional models using cross correlation, warp the three-dimensional model generated from the sensors of the second type such that salient points are collocated with the salient points of the three-dimensional model generated from the sensors of the first type;
  determine a relationship between salient points on the warped three-dimensional model and locations on a two-dimensional image from the sensors of the second type;
  register the image from the first sensor of the second type with the image of the first sensor of the first type and fuse the images;
  register the image from the second sensor of the second type with the image from the second sensor of the first type and fuse the images; and
  display the fused images on the display.

11. The mobile three-dimensional sensor configuration of claim 9, wherein the program code is further configured, when executed by the processor, to determine the list of matching stereo point pairs for the sensors of the first type or the second type by:
  selecting the image from the first sensor;
  performing a multi-scale Harris Corner Detection on the image from the first sensor and extracting a first list of salient points;
  selecting the image from the second sensor;
  performing a multi-scale Harris Corner Detection on the image from the second sensor and extracting a second list of salient points;
  receiving azimuth and elevation information about the first sensor;
  receiving azimuth and elevation information about the second sensor;
  receiving separation distance between the first and second sensor;
  mapping the first list of salient points with the second list of salient points using azimuth, elevation, and distance information to match salient points between the first list of salient points and the second list of salient points; and
  output list of matched salient point pairs.

* * * * *